Aug. 3, 1965   E. F. KAMIN   3,198,355
BODY FOR REFUSE-COLLECTION VEHICLE
Filed April 2, 1962   2 Sheets-Sheet 1

Ernest F. Kamin
INVENTOR.

BY Ramsey, Kolisch & Hartwell
Attys.

Aug. 3, 1965  E. F. KAMIN  3,198,355
BODY FOR REFUSE-COLLECTION VEHICLE
Filed April 2, 1962  2 Sheets-Sheet 2
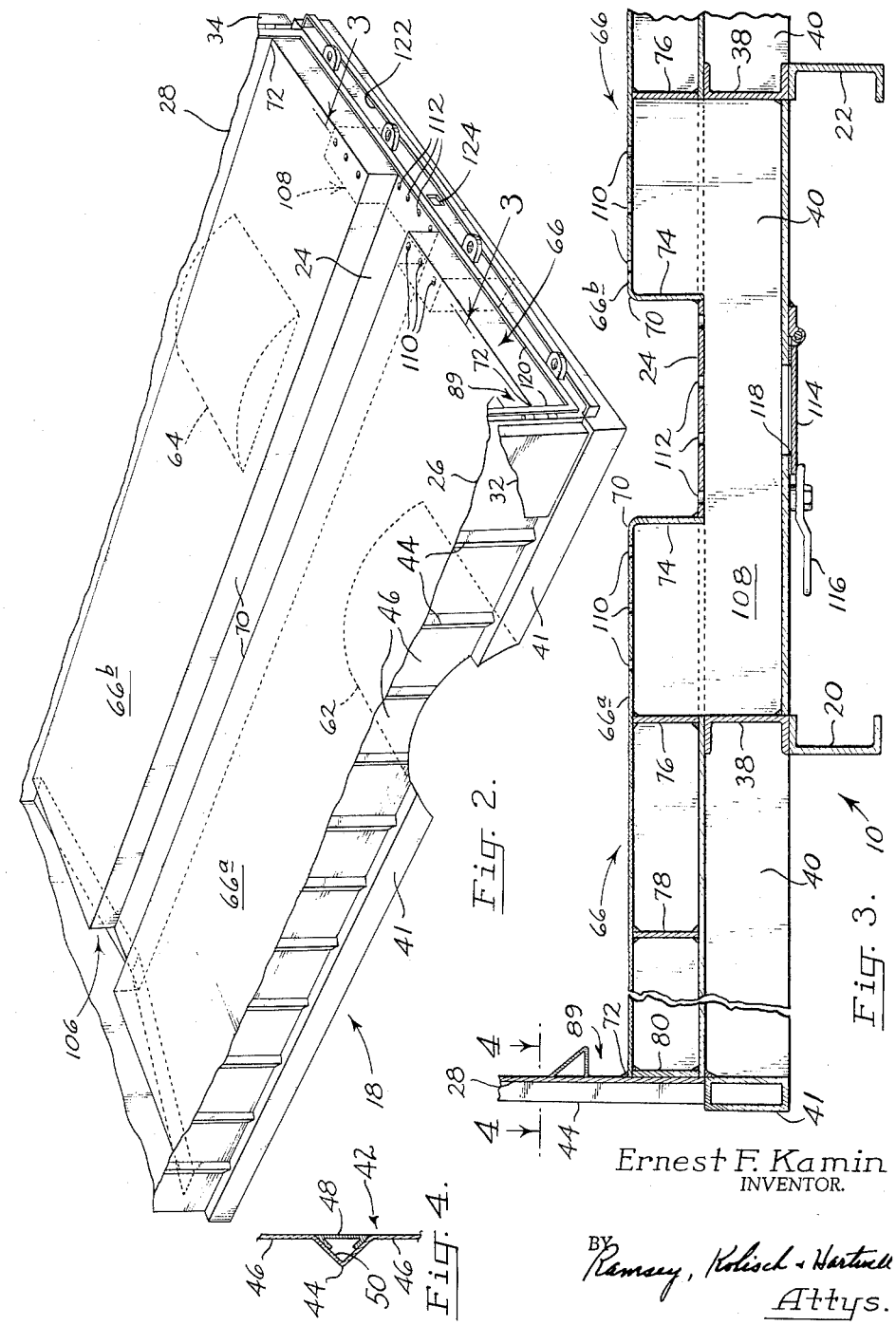
Ernest F. Kamin
INVENTOR.
BY Ramsey, Kolisch & Hartwell
Attys.

United States Patent Office 3,198,355
Patented Aug. 3, 1965

3,198,355
BODY FOR REFUSE-COLLECTION VEHICLE
Ernest F. Kamin, 1648 N. Ross Ave., Portland, Oreg.
Filed Apr. 2, 1962, Ser. No. 184,020
5 Claims. (Cl. 214—82)

This invention relates to vehicle body constructions, and more particularly to a construction for a hollow body that may be provided for a refuse-collection vehicle for receiving refuse or rubbish.

A common truck may comprise a wheel-supported frame, and mounted on the frame and over the rear wheels of the truck a hollow body including a floor and side walls. The floor of the body is not completely flat, as wheel wells are provided to accommodate the rear lateral support wheels of the truck. When such a vehicle is used as a collection vehicle for refuse, such as garbage and the like, any power-actuated packer provided with the body ordinarily has its movement limited by the wheel wells. Movement of the packer from a position in front of the wheel wells rearwardly to a position to the rear of the wheel wells may only be accommodated if notches are provided in the blade of the packer to allow clearance for the wheel wells, which has obvious disadvantages. As a consequence, when such trucks are used to collect garbage, they have relied upon tilting of the hollow body, in the manner of dump trucks, for the removal of all rubbish when emptying a load therefrom.

A general object of this invention is to provide an improved construction for the base or bottom of a hollow refuse-collecting body and the like, whereby any packer mounted therein is enabled to move completely to the rear of the body and over the wheel wells for the purpose of dumping rubbish therefrom.

Another object of the invention is to provide a novel construction for the base of such a hollow body, where the usual floor provided in the body is utilized for such purposes as for guiding the packer in its movement, to facilitate the drainage of any fluids that may collect in the body, and to provide maximum clearance for any ram or similar power-actuated mechanism that operates the packer, whereby the longest possible stroke is obtainable in the ram.

According to this invention, elevated platform portions are provided inside the hollow body, with outer margins or edges adjacent the side walls of the body, and inner edges spaced apart along a zone that extends longitudinally of the vehicle, ordinarily substantially over its midline. The platform portions are elevated from the floor, and pass uninterruptedly over the usual wheel wells hereinabove mentioned. The inner margins or edges of the platform portions are connected by upstanding walls to the floor of the hollow body, so that an elongated recessed runway or channel is present along the bottom and inside of the vehicle body. The packer in the vehicle body provided for compacting refuse includes a nose portion received within the runway mentioned.

As a result of the above organization, the following advantages are obtained: The nose portion, in conjunction with the runway, functions to guide the packer in its movement to and fro. Extra clearance is provided by the channel for any ram employed to actuate the packer. The runway or channel functions as a drain for any fluids collected as the refuse is collected. The platform portions themselves in a longitudinal direction provide a flat expanse between the front and rear of the vehicle body, whereby the packer may move without hindrance over the wheel wells for the purpose of fully unloading rubbish.

Other objects and advantages are attained by the invention, and the same is described hereinbelow in conjunction with the accompanying drawings, wherein:

FIG. 2 is a perspective view, and with parts removed and brokein away, illustrating the floor of the vehicle body in FIG. 1, and platforms thereon;

FIG. 3 is a cross-sectional view, taken generally along the line 3—3 in FIG. 2, and somewhat enlarged; and FIG. 4 is a cross-sectional view, taken generally along the line 4—4 in FIG. 3.

Figure 1:
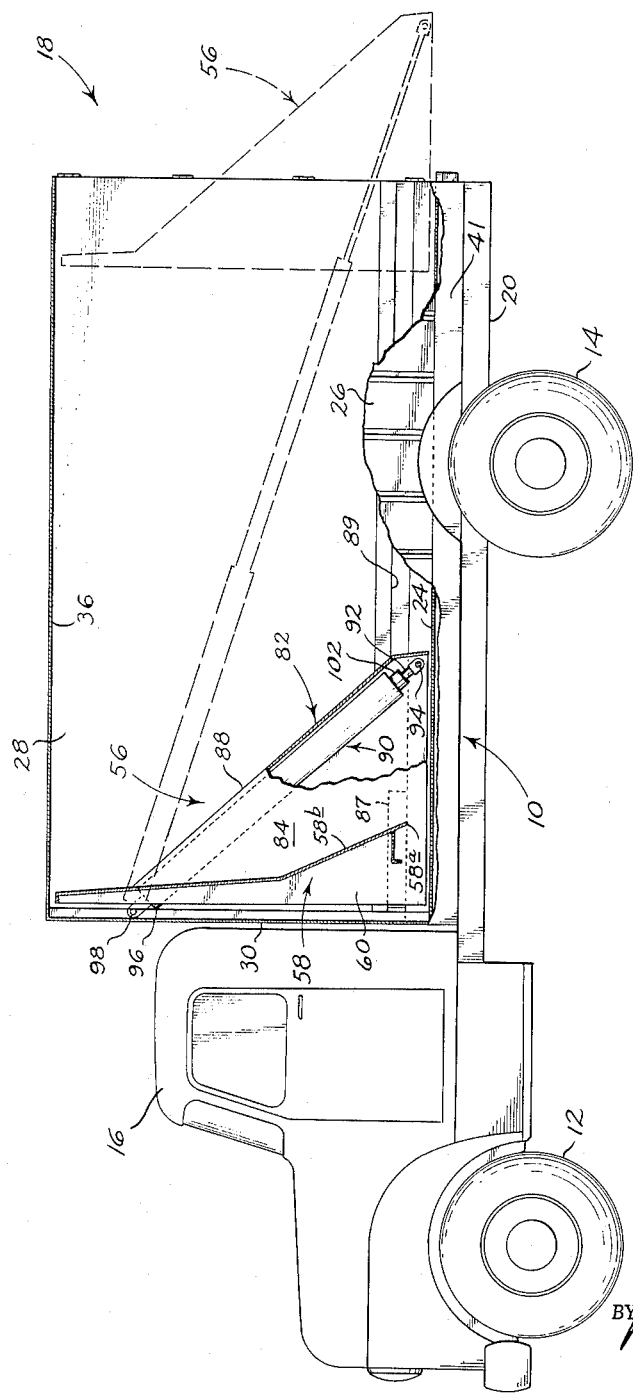
FIG. 1 is a side view of a refuse-collection vehicle, constructed as contemplated according to one embodiment of the invention, such vehicle including at the rear thereof a hollow refuse-collecting body, and portions of such body having been broken away in order to illustrate details of interior construction.

Referring now to the drawings, and first of all more particularly to FIG. 1, a refuse-collection truck or vehicle is illustrated, comprising a vehicle frame 10 and lateral support wheels 12 and 14 at the front and rear of the vehicle, respectively. A cab for the vehicle is shown at 16, and the rear of the cab and mounted on frame 10 is a hollow refuse-collecting body, indicated generally at 18.

Further describing frame 10, and referring now also to FIG. 3, the frame comprises a pair of laterally spaced and longitudinally extending frame members 20, 22. These typically extend over the rear axle (not shown) that mounts support wheels 14, such support wheels normally including a set of wheels positioned outwardly of one of the frame members, and another set of wheels positioned outwardly of the other frame member.

Referring to FIGS. 1-4, hollow refuse-collecting body 18 includes a floor 24, opposed sides 26, 28, a front wall 30, doors 32, 34 used to close off the rear end of the body (in FIG. 3 portions only of the doors are shown, and these are shown swung open), and a ceiling 36.

Considering first the construction of floor 24, resting on the top of and secured to frame members 20, 22 are elongated channel irons 38. These also extend longitudinally of the vehicle. Extending transversely of the channel irons, and spaced at regular intervals along the length of body 18, are transverse members 40. Floor 24 rests on the top of channel irons 38 and members 40, and is suitably fastened thereto.

Sides 26, 28 of the refuse-collecting body extend upwardly from floor 24. Bumper bars 41 extend along and are secured to the bottom edges of the sides. Since refuse or rubbish within the body is compacted as it is collected, it is important that the sides be strong enough to withstand considerable pressure directed laterally outwardly. Thus, the walls are shown as made of reinforced plate 42 (see FIG. 4). The plate includes ridges 44 that project laterally outwardly and extend vertically along the sides. The ridges alternate with vertically extending flat reaches 46. In order that the insides of sides 26, 28 be substantially flat (whereby any packer in the body may move snugly thereover), channel-shaped inserts 48 are fastened over elongated recesses 50 that appear on the insides of sides 26, 28 opposite ridges 44.

Front wall 30 and ceiling 36 may comprise panels secured in the case of wall 30, to the floor and sides and, in the case of the ceiling, to the top of wall 30 and sides 26, 28. Doors 32, 34 are conventional.

A packer 56 is provided within the hollow refuse-collecting body. The packer is utilized to compact refuse as it is thrown into the truck. Packer 56 includes a transversely extending packer blade 58, with a bottom edge 58a along its base. The front face 58b of the plate faces the rear of the truck and is vertically cupped. Strengthening the back of the plate are vertical braces, such as brace 60.

Floor 24 of body 18, as can be seen with reference to

FIG. 3, is provided with wheel wells indicated at 62, 64. These accommodate the tops of lateral support wheels 14 disposed therebeneath. These wheel wells arch upwardly from the place of the floor, so that the floor is not flat over its entirety.

According to this invention, platform structure, indicated generally at 66, is provided that covers most of the floor and forms the major portion of the bottom and inside of body 18. The top of the platform structure, and the remaining exposed portion of floor 24, are flat and straight in a longitudinal direction. The packer may move over the platform structure and floor to the position shown in dashed outline in FIG. 1 without its progress hindered by the wheel wells.

Specifically, the platform structure comprises a pair of elevated platform portions 66a, 66b. One extends longitudinally along each side of floor 24. Each platform terminates in an inner edge, indicated at 70. These two inner edges are spaced apart from each other, in a zone extending substantially midway between sides 26, 28, or along the midline of the body. This zone is also located between frame members 20, 22, as can be seen in FIG. 4. The platform portions have outer edges 72 joined to the sides 26, 28 in a suitable manner.

Each platform portion is supported above floor 24 along its inner edge by means of an upright wall 74, joined to floor 24 and the platform portion. Also supporting the platform portions in their elevated position are elongated webs 76, 78, 80 extending longitudinally of the vehicle body and paralleling wall 74. Preferably one of the webs (web 76) is directly above a channel iron 38, and one (web 80) is directly adjacent a side 28 of body 18 under edge 72.

Walls 74 of the two platform portions, together with that portion of floor 24 that lies between the walls, define an elongated recessed runway or channel extending longitudinally of the vehicle. This runway is important, as it guides the packer during its movement within the body, provides a gutter for receiving fluid that may be present in the garbage, and also provides extra room for the ram used to move the packer.

More specifically, packer 56 includes, in addition to the packer blade, a nose portion 82 extending forwardly of the front face of the packer (or to the rear of body 18). This nose portion is defined by sides 84, and an inclined top indicated at 88. The base of the nose portion is snugly received within the channel between the platform portions. Sides 84, by being snugly adjacent walls 74, move material out of the channel when the nose portion is moved rearwardly in body 18. The channel guides the nose portion, and thus the packer blade connected to the nose.

Guides for the ends of blade 58 may also be provided. In the form of the invention shown, blocks 87 mounted on blade 58 slide within grooves 89 along the sides 28 of body 18, thus to guide the ends of blade 58.

The power-actuated means for moving the packer to and fro comprises a ram 90. Ram 90 has an extensible end 92 (the rod in the ram) joined to a forward part of the nose portion, as by pivot connection 94. The opposite end of the ram, indicated at 96 (which is its nontraveling end and comprises a cylinder), is pivotally connected to the refuse-collecting body as at 98. With the packer in its retracted position, as shown in FIG. 1 in solid outline, the ram inclines downwardly progressing toward the rear of the body with substantially the same incline as top 88 of the nose portion.

Ram 90 includes, in addition to a cylinder 96 and rod 92, a sleeve 102. The sleeve is mounted within the cylinder and is extensible therefrom, and rod 92 is mounted within the sleeve and cylinder and is extensible from the sleeve.

On full extension of the ram, the ram moves to the position shown in dashed outline in FIG. 1. During extension the incline of the ram decreases. It should be noted that on movement of the packer to the rear of body 18, the packer blade is pulled rather than pushed, because of the connection of the ram with the nose portion in front of the packer blade. Also, it should be noted that because of the incline of the ram, the nose portion is forced downwardly against floor 24 adjacent its forward end. This inhibits rubbish from collecting beneath the nose portion during movement of the packer.

For collecting fluid that may be in the refuse, a trough 106 is provided at the forward end of body 18. This connects with the channel extending down between platform portions 66a, 66b. At the rear of the body is a sump indicated at 108. Fluid may flow into sump 108 through bores 110 provided in the platform portions, and bores 112 provided in floor 24 (see FIG. 3).

It is ordinary practice to wash down the entire interior of the body and this is done after the refuse has been removed. With the vehicle empty, the floor of the body normally declines toward the cab. Thus, wash water, as opposed to garbage juices, will tend to collect within the trough 106. For the removal of said wash water, it is common to provide a drain (not shown) which is capable of being opened and closed at a low point in the trough 106, as is self-suggestive to any person skilled in the art.

The sump may be cleared of liquid and other material therein by opening a hinged cover 114 provided at the base of the sump. A latch 116 holds the cover in the closed position, shown in FIG. 3, with a seal 118 providing a fluid-tight connection between the cover and the base of the sump. A similar cover, catch and latch (not shown) may be provided at the base of trough 106.

Around the door opening at the rear of body 18 there may be provided a seal 120. With the door closed, the seal prevents leakage of fluid around the doors. A gutter under the door opening is shown at 122. The gutter drains through opening 124 into sump 108.

Summarizing some of the features of the construction, it will be noted that because of the runway along the midline of body 18, a number of advantages result. The space provided by the runway may be utilized in mounting a portion of the ram, whereby the longest possible ram may be used (such resulting in a long stroke upon extension of the ram). The runway also channels fluid it collects into the trough and sump described. The runway also guides the nose portion during travel of the packer between retracted and extended positions. While acting as a guide, the same is cleared by the forward part of the nose portion each time the packer is moved to the rear of body 18.

The platform portions extend uninterruptedly over the wheel wells, to provide a smooth expanse in a longitudinal direction. The blade moves closely adjacent the tops of the platform portions during its movement. The blade may be moved completely to the rear of the body to clear the vehicle, as shown in FIG. 1.

The reinforced construction of the sides of the body provides strength inhibiting buckling of the sides when compaction pressures are produced by the packer. The ridges in effect function as strong backs extending vertically along the sides. While the ridges are provided, the inside surface of each side is flat.

I claim:

1. In a vehicle comprising a wheel-supported vehicle frame and a body including a floor supported above and mounted on said frame, an elevated platform portion extending longitudinally along each side of said floor, said elevated platform portions terminating in longitudinally extending inner edges that are spaced apart from each in a zone intermediate the sides of said floor, an upright wall joining the inner edge of each of said platform portions and said floor, said upright walls and floor defining an elongated runway extending longitudinally of said body recessed from the level of said platform portions and having a top communicating with the inside of said body along the length of the body, and a power-actuated packer including a packer blade extending over said platform portions and transversely of said floor, said packer including a portion that projects down from the packer blade into said runway between said platform portions to adjacent said floor.

2. In combination with a refuse-collection vehicle comprising a wheel-supported frame and an elongated substantially hollow refuse-collecting body including a floor and opposed side walls mounted on said frame, a pair of laterally spaced and elevated platform portions between the side wall and extending longitudinally of said body, said platform portions terminating in inner edges that are substantially parallel and spaced apart from each other in a zone substantially along the longitudinal midline of said body, said platform portions having outer edges joined to the side walls of said body, an upright wall joining the inner edge of each of said platform portions and said floor, said upright wall and floor along said zone defining an elongated runway extending longitudinally of said body recessed from the level of said platform portions with the top thereof communicating with the inside of said body along the length of the body and a power-actuated packer including a packer blade extending over said platform portions transversely of said floor, said packer including a nose portion fitted into said runway between said platform portions and extending below the platform portions to adjacent said floor.

3. In combination with a refuse-collection vehicle having a vehicle frame, front and rear lateral support wheels for said frame, and a refuse-collecting body mounted on siad frame, said body including side walls and a floor and said floor having wheel wells on either side thereof accommodating the rear lateral support wheels of the vehicle, the improvement comprising a substantially flat elevated platform portion extending longitudinally of the vehicle adjacent each side wall of said body and joined to the side wall, each of said platform portions being elevated from the floor a distance sufficient to pass uninterruptedly over the top of one of said wheel wells in said floor, said platform portions terminating in inner edges that are substantially parallel and spaced apart from each other in a zone substantially along the longitudinal midline of said body, an upright wall for each platform portion joining the inner edge of the platform portion and the floor, said upright walls and floor along said zone defining an elongated runway extending longitudinally of said body recessed from the level of said platform portions with the top of the runway communicating with the inside of said body along the length of the body, and packer means within said body movable over said platform portions.

4. In combination with a refuse-collection vehicle comprising a vehicle frame including a pair of laterally spaced and longitudinally extending frame members, front and rear lateral support wheels for said frame, and a refuse-collecting body mounted on said frame over said frame members, said body including side walls and a floor and said floor having wheel wells on either side thereof accommodating the rear lateral support wheels of the vehicle, the improvement comprising a susbtantially flat elevated platform portion extending longitudinally of the vehicle adjacent each side wall of said body and joined to the side wall, each of said platform portions being elevated from the floor a distance sufficient to pass uninterruptedly over the top of a wheel well, said platform portions terminating in substantially parallel inner edges that are spaced apart from said other in a zone extending along the longitudinal midline of said body between said longitudinally extending frame members, an upright wall for each platform portion joining the inner edge of the platform portion and said floor, said upright walls and floor in said zone defining an elongated runway extending longitudinally of said body recessed from the level of said platform portions with the top thereof communicating with the inside of said body along the length of the body, at least a pair of elongated and longitudinally extending webs supporting each of said platform portions above the floor including one web disposed substantially over a longitudinally extending frame member and one web adjacent a side wall of the vehicle body, and packer means within said body movable over said platform portions, said packer means including structure which projects into said runway.

5. In a refuse-collection vehicle comprising a wheel-supported from and an elongated substantially hollow refuse-collecting body including a floor mounted on said frame, opposed side wall for said body extending up from opposite side margins of said floor, said side walls having corrugations therein defined by outwardly projecting and vertically extending ridges alternating with vertically extending flat reaches, each of said side walls having means providing a substantially flat vertical expanse over the inside thereof, a pair of laterally spaced elevated platform portions between said side walls and extending longitudinally of said body, said platform portions terminating in outer edges that are joined to the inside of said side walls and terminating in inner edges that are substantially parallel and spaced apart from each other in a zone extending along the longitudinal midline of said body, an upright wall joining the inner edge of each of said platform portions and said floor, and a power-actuated packer over said platform portions including a packer blade extending transversely of said floor, said packer also including a portion fitted within the space between said platform portions.

References Cited by the Examiner
UNITED STATES PATENTS

| | | | |
|---|---|---|---|
| 2,785,792 | 3/57 | Cordis | 198—224 |
| 2,800,234 | 7/57 | Herpich et al. | 214—82 |
| 2,912,128 | 11/59 | Kamin | 214—82 |
| 2,934,226 | 4/60 | Dempster et al. | 214—82 |
| 2,999,606 | 9/61 | Kamin | 214—82 |
| 3,170,578 | 2/65 | Moreland | 214—82 |

HUGO O. SCHULZ, *Primary Examiner.*

MORRIS TEMIN, *Examiner.*